United States Patent
Förster et al.

[11] 3,727,487
[45] Apr. 17, 1973

[54] PRESSURE CONTROL INSTALLATION FOR HYDRAULICALLY SHIFTED AUTOMATIC TRANSMISSIONS, ESPECIALLY FOR MOTOR VEHICLES

[75] Inventors: Hans-Joachim M. Förster, Stuttgart-Riedenberg; Arwed Von Koch, Stuttgart-Sonnenberg; Hermann Gaus, Stuttgart-Sillenbuch, all of Germany

[73] Assignee: Daimler-Benz Aktiengesellschaft, Stuffgart-Untertrkheim, Germany

[22] Filed: Apr. 2, 1970

[21] Appl. No.: 25,121

[30] Foreign Application Priority Data
Apr. 3, 1969 Germany..................P 19 17 291.9

[52] U.S. Cl. .................74/865, 74/867, 137/625.64, 251/129
[51] Int. Cl. ..........................B60k 21/02, F16k 31/02
[58] Field of Search........................74/865, 866, 867, 74/868, 869; 251/129; 137/625.64

[56] References Cited
UNITED STATES PATENTS 3,621,735   11/1971   Lemieux..............................74/869 X
3,621,864   11/1971   Tonegawa et al. ...................251/129
2,875,634   3/1959    Gelenius et al..........................74/868
3,080,768   3/1963    Jania .......................................74/869
3,225,619   12/1965   Schaefer..................................74/869
3,324,738   6/1967    Olsen et al..........................74/868 X
3,398,607   8/1968    Chana ................................74/868 X
3,410,308   11/1968   Moog, Jr. et al..................251/129 X
3,461,909   8/1969    Vohringer .........................251/129 X
3,537,467   11/1970   Marshall......................137/625.64 X

FOREIGN PATENTS OR APPLICATIONS 740,225   11/1955   Great Britain...................137/625.64

*Primary Examiner*—Charles J. Myhre
*Assistant Examiner*—Thomas C. Perry
*Attorney*—Craig, Antonelli & Hill

[57] ABSTRACT

A pressure control installation for hydraulically shifted automatic transmissions, particularly for motor vehicles, which controls the pressure of a hydraulic medium that effects the shifting operations in dependence on an operating magnitude, whereby the regulation of the pressure is achieved electrically, preferably by the use of a solenoid valve controlling a pilot pressure.

11 Claims, 13 Drawing Figures

INVENTORS
HANS-JOACHIM FÖRSTER
ARWED VON KOCH
HERMANN GAUS

BY Craig, Antonelli,
Stewart & Hill
ATTORNEYS

INVENTORS
HANS-JOACHIM FÖRSTER,
ARWED VON KOCH
HERMANN GAUS

BY Craig, Antonelli, Stewart and Hill
ATTORNEYS

INVENTORS
HANS-JOACHIM FÖRSTER
ARWED VON KOCH
HERMANN GAUS

BY *Craig, Antonelli, Stewart & Hill*

ATTORNEYS

INVENTORS
HANS-JOACHIM FORSTER
ARWED VON KOCH
HERMANN GAUS

BY
Craig, Antonelli, Stewart & Hill

ATTORNEYS

PRESSURE CONTROL INSTALLATION FOR HYDRAULICALLY SHIFTED AUTOMATIC TRANSMISSIONS, ESPECIALLY FOR MOTOR VEHICLES

The present invention relates to a pressure control installation for hydraulically shifted automatic transmissions, especially for motor vehicles, with a regulation or control of a control pressure effecting either directly or indirectly the shifting operations in dependence on an operating magnitude.

Known pressure control installations of this type in which the regulation or control takes place mechanically in dependence on the operating magnitude, entail the disadvantage that the enlarged adjusting path for a so-called kick-down position, necessary for the control, was not always attainable with certainty by reason of the unavoidable tolerances. Additionally, a mechanical linkage is subjected to wear and requires frequent readjustment.

It is the aim of the present invention to avoid above all the disadvantages of the mechanical pressure regulation and to achieve a reliable control. Accordingly, the present invention essentially consists in that the regulation or control of the control pressure takes place in an electrical manner in dependence on the operating magnitude, especially of the accelerator lever position, the engine torque or the vehicle velocity.

Preferably, an electrically actuated valve, especially a magnetic or solenoid valve is used for that purpose, whose energization is controlled by a transmitter controlled by the operating magnitude and which is opened against the electrically controlled counter-force by the control pressure to be regulated of the hydraulic medium. An amplifier is preferably interconnected between the transmitter, for example, between a potentiometer or an inductive transmitter actuated by the accelerator pedal, on the one hand, and the electric control device, for example, a magnetic or solenoid valve, on the other, which amplifier assures the necessary adjusting force.

The hydraulic pressure which is regulated or controlled electrically, especially by a solenoid valve, can be rendered effective on the different control elements of the automatic transmission shifting mechanism in that, in its turn, it controls either directly or indirectly preferably as pilot or pre-control pressure, a working pressure, for example, a control or shifting pressure necessary for shifting or engaging the various speeds. The pressure system controlled by the control pressure valve or the magnetic valve may thereby be in communication with the line system of a hydraulic medium supplied by a pump, possibly of modulated pressure, by way of a throttle and may serve for the regulation or control of this pressure, whereby also a control may be provided in such a manner that in case of a failure of the electric control part, the line system of the pressure to be controlled is not rendered inoperable, i.e., put out of action as a result of the interrupted function of the electric part.

If, as this is customarily the case, the hydraulic pressure in the line system of the pressure to be controlled, for example, upstream of an inlet throttle, is variable, then the control pressure valve constructed as magnetic valve has to open farther in case of a large hydraulic pressure than with a small pressure. However, the magnetic force should not change in that case if the pressure to be controlled by the magnetic valve (the pre-control pressure) is to remain constant. By a corresponding shape of the magnet, for example, of a bell-shaped armature and of an annular gap cooperating therewith in the magnet housing, it may be achieved that the magnetic force remains nearly constant within a predetermined stroke range. Preferably, this stroke range is utilized as control range of the magnetic valve.

The magnetic or solenoid valve further permits a versatile additional application since it is utilizable practically in dependence on every operating magnitude which might be considered for a control operation. Also, any desired characteristic can be achieved in a relatively simple manner. Thus, the combined electric-hydraulic control system may be utilized, for example, to obtain a shifting-back by means of a "full-gas" or "-kick-down" signal and to let a range-shifting-back operation proceed as brake shifting operation by means of an "idling-gas" signal.

Accordingly, it is an object of the present invention to provide a pressure control installation for hydraulically shifted automatic transmissions which avoids by simple means the aforementioned shortcomings and drawbacks encountered in the prior art.

Another object of the present invention resides in a pressure control installation for hydraulically shifted automatic transmissions which eliminates the wear normally occurring in mechanical linkages.

A further object of the present invention resides in a pressure control installation for hydraulically shifted automatic transmissions which assures reliable control operation and avoids the need for frequent re-adjustments.

Still a further object of the present invention resides in a pressure control installation for hydraulically shifted automatic transmissions in which the regulation of the control pressure takes place electrically in dependence on an operating pressure.

These and further objects, features and advantages of the present invention will become more obvious from the following description when taken in connection with the accompanying drawing which shows, for purposes of illustration only, several embodiments in accordance with the present invention, and wherein.

Figure 1:
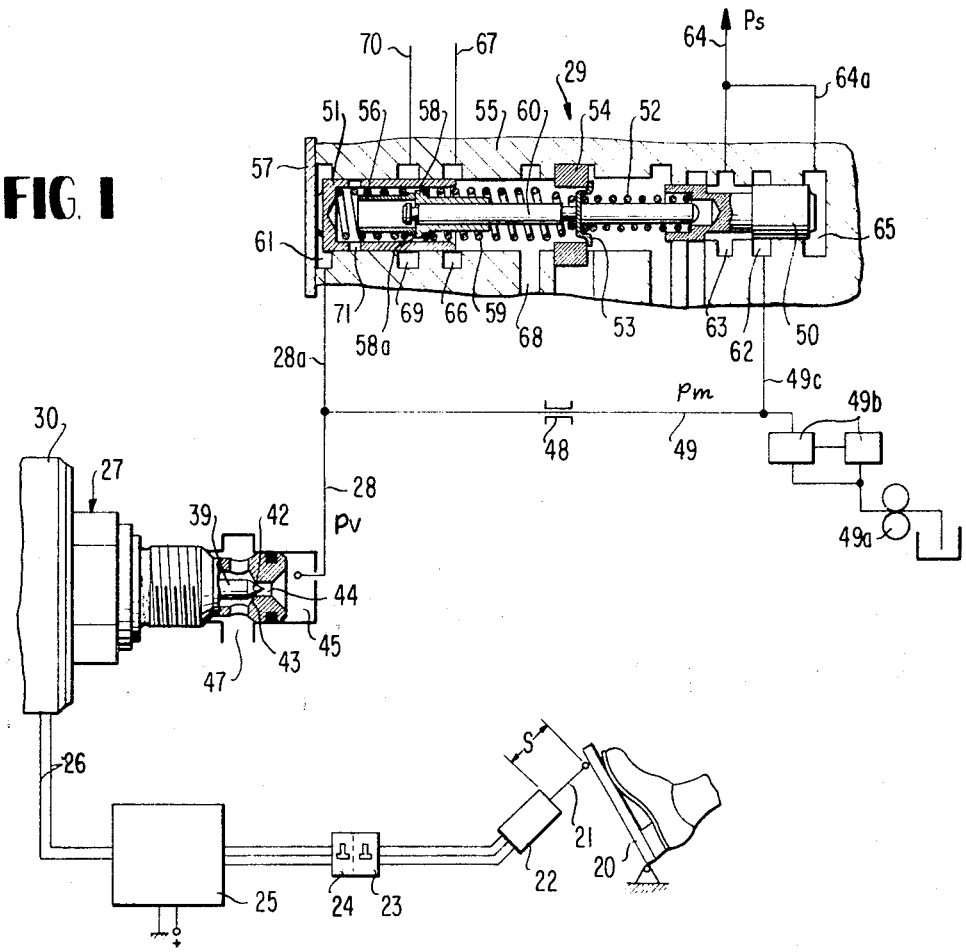
FIG. 1 is a schematic view of a control installation according to the present invention for the operation of an electromagnetic pilot or pre-control valve by means of an accelerator lever.

Referring now to the drawing wherein like reference numerals are used throughout the various views to designate like parts, and more particularly to the schematic view of FIG. 1, reference numeral 20 designates in this figure an accelerator lever, such as a gas pedal, actuated by the foot of the driver, which actuates a transmitter 22 by means of a plunger 21, that, for example, permits a stroke $s$ of the accelerator lever 20. The transmitter 22 is constructed, for example, as multi-partite potentiometer of conventional type having an ohmic resistance variable in dependence on the stroke $s$, as will be explained more fully hereinafter in connection with FIG. 2.

Lines lead from the transmitter 22, for example, by way of switches 23 and 24, that permit selective engagement or disengagement of the automatic shifting mechanism to an amplifier 25 which, for example, by means of a transistor, supplies an amplified current in dependence on the resistance selected by the transmitter 22. The amplified current is fed by way of lines 26 to a magnetic or solenoid valve generally designated by reference numeral 27 which is illustrated in detail in FIG. 3 and serves as pilot or pre-control valve for the purpose to regulate in a line 28 a predetermined pilot or pre-control pressure that is rendered effective on a control slide valve unit generally designated by reference numeral 29 in a manner to be explained more fully hereinafter.

Figure 2:
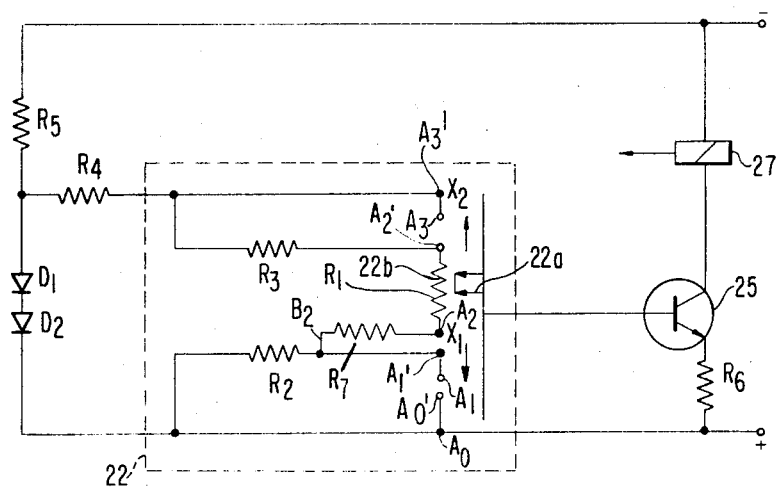
FIG. 2 is a schematic wiring diagram for the actuation of the magnetic valve in accordance with the present ivention.

A circuit diagram, for example, an electric circuit diagram for the actuation of the magnetic valve 27 is illustrated in FIG. 2. A sliding contact 22a in the transmitter 22 is slidingly guided by means of the accelerator lever 20 (not illustrated in FIG. 2) in the direction of arrow $x_1-x_2$ over a line 22b with a resistance $R_1$ from a point $A_0$ by way of points $A_1$, $A_2$ and $A_3$ up to point $A_3'$ and controls or regulates thereby the current flowing to the amplifier 25 and thus to the magnetic valve 27. Input resistances $R_2$, $R_3$ and $R_7$ may be arranged in the transmitter 22, and matching resistances $R_4$ and $R_5$ may be arranged in the return line and a protecting resistance $R_6$ may be arranged in the input to the transistor 25 in the circuit of the magnetic valve 27. Diodes $D_1$ and $D_2$ may serve for the stabilization of the voltage and for the temperature compensation in the circuit. A change of the pilot or pre-control pressure, for example, as a result of a heating-up of the oil, of the winding or of the amplifier, can be far-reachingly prevented thereby. Also, by a change of the matching, i.e., by a change of the resistances such as matching resistances $R_4$ and $R_5$ a parallel displacement of the characteristics is possible to position the characteristics either higher or lower than that shown, for example, in FIG. 5 so that a one-time adjustment in conjunction with the magnetic or pilot control valve 27 may be undertaken.

The transmitter is constructed corresponding to a desired predetermined characteristic in the path-pressure diagram (FIG. 5) so that when depressing the accelerator lever, each position of the latter corresponds to a predetermined control pressure according to these characteristics.

Instead of a potentiometer also an inductively operating transmitter of conventional construction may be used, operating by means of induction coils, if an A. C. power supply is utilized in lieu of the illustrated D. C. power supply.

The magnetic valve 27 operates in the manner of an excess pressure valve whose closure force, instead of being produced by a valve spring, is produced by a magnetic force that can be varied between zero and a maximum value depending on the position of the accelerator lever 20.

Figure 3:
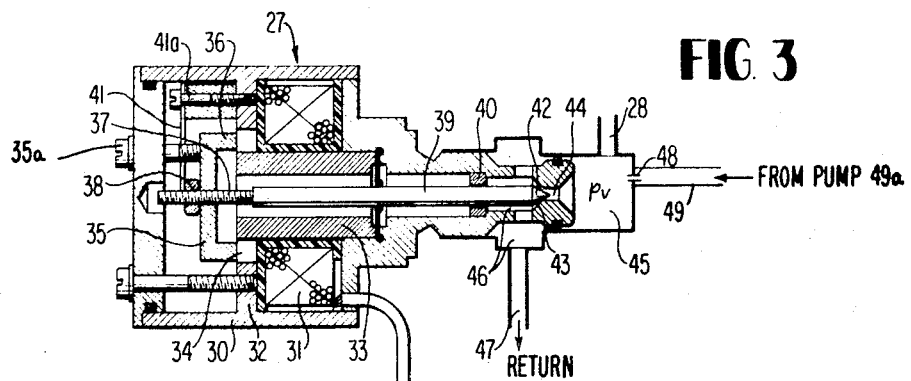
FIG. 3 is a cross-sectional view through a magnetic valve in accordance with the present invention serving as pre- or pilot control valve.

As is illustrated in FIG. 3, the solenoid valve generally designated by reference numeral 27 includes a multi-partite housing 30 in which is accommodated the magnetic winding or coil 31 supplied with current by way of the line 26. An annular gap 34 is formed between a housing cross wall 32 laterally delimiting the magnetic winding 31 and a sleeve-shaped part 33, acting as magnetic core, of the valve housing 30; the bell-shaped armature 35 is thereby adapted to approach more or less the annular gap 34 by means of its rim 36 and/or is able to enter more or less into the annular gap 34.

A valve needle 39 is rigidly connected with the armature 35, adjustable in the longitudinal direction by means of a threaded portion 37 and nut 38; the valve needle 39 is slidingly supported appropriately in the bearing 40 of frictionless, synthetic resinous material, for example, of Teflon, and is suspended at a leaf-spring 41 secured at the housing by means of screw 41a. The bearing support may also be realized by means of two such bearings 40 and without leaf-spring 41. The leaf spring 41 is clamped fast by means of the screw 41a and extends past the screw 35a up to the threaded portion 37 which is carried by the leaf spring 41. To that end, the leaf spring 41 may, for example, engage in a thread of the threaded portion 37 so that the valve 42 is lifted off from its seat 43 by the spring force of the leaf spring 41. The valve needle 39 cooperates by means of its conical needle end 42 with a seat 43 in the valve housing 30 and thereby controls an opening 44 for the flow therethrough of the hydraulic medium. The space 45 upstream of the valve needle 39, 42, forms a part of the feed line 28 whereas the space 46 downstream of the valve needle 39 is connected with a return line 47 leading to a supply tank or the like (not shown).

The line 28 and therewith the space 45 which is under a pilot or pre-control pressure $p_v$, is in communication by way of a throttle 48 with a feed line 49, to which is supplied a hydraulic medium at a predetermined pressure from a pump 49a by way of suitable conventional control devices 49b (FIG. 1).

The control slide valve unit 29 (FIG. 1) for the control or regulation of the control pressure serving for the direct or indirect shifting of a transmission shifting element, for example, of a command slide valve member, is provided with a piston-like slide valve portion 50 and with a piston-like slide valve portion 51. The slide valve portion 50 is under the effect of a compression spring 52 which is supported with its one end (right end as viewed in FIG. 1) at the slide valve member 50 and with its other end (left end as viewed in FIG. 1) by means of a spring washer 53 at a fixed abutment 54 in the slide valve housing 55. The slide valve part 51, in its turn, is under the effect of a compression spring 56 which seeks to press the slide valve part 51 toward the left as viewed in FIG. 1 against a cover 57 of the housing 55 and, on the other, supports itself against a spring guide part 58. The latter is thereby acted upon on the side opposite the spring 56, by a spring 59 which is supported with its opposite end against the spring washer 53 that is secured on a guide pin 60 supported unilaterally at an abutment 58a of the spring guide part 58. The springs 52, 56 and 59 are so dimensioned that the strength of the spring 59 exceeds that of the spring 52 and the strength of the spring 52 exceeds that of the spring 56.

The space 61 at the left end of the slide valve part 51 is connected with the line 28 for the pilot or pre-control pressure, for example, by way of a line 28a whereas a control groove 62 at the slide valve part 50 is connected, for example, by way of a branch line 49c with the line 49 that is under the modulating pressure $p_m$. With a small movement of the slide valve part 50 toward the right as viewed in FIG. 1, the control groove 62 may enter into communication with a further control groove 63 to which is connected a line 64 that leads to the shifting elements, for example, to the command slide valves of the automatic transmission and is connected by means of a branch line 64a with the space 65 at the right end of the slide valve part 50.

Further lines may be valved by the control slide valve 29 as can be readily seen from FIG. 1. Thus, for example, a control groove 66 is connected with a line 67 which actuates an "idling-gas" signal when the control groove 66 is opened up by the slide valve part 51 and thus is connected with a discharge, for example, at 68. A further control groove 69 is in communication with a line 70 in order to produce a "kick-down signal" when the control groove 69, upon depressing fully the accelerator lever 20 and thus displacing the slide valve part 51 toward the right, is connected by a cross bore 71 in the slide valve part 51 with the interior thereof and therewith with the exhaust or discharge line 68.

OPERATION

The operation of the installation described so far is as follows:

As long as the acclerator lever 20 is not depressed and the winding 31 of the magnetic valve 27 is de-energized, i.e., without current (corresponding to point $A_0$ in FIGS. 2 and 5) due to the blocking action of the transistor 25 which is non-conductive when its base voltage is at the same potential as its emitter voltage, the valve needle 39 is lifted off from its seat 43 by the hydraulic medium so that the medium flowing through the line 28 is able to flow off, without resistance, by way of exhaust 47 and therewith no pressure is able to build up in the line 28.

Figure 4:
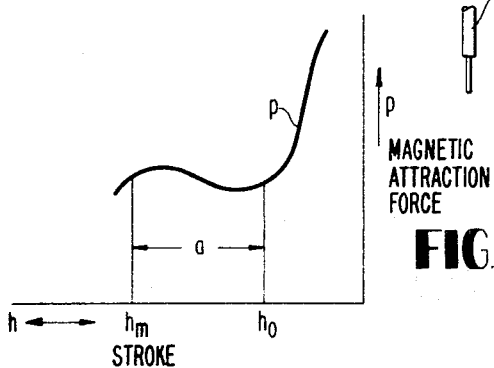
FIG. 4 is a diagram illustrating the relationship between stroke and attraction or pull force of the magnetic valve.

A diagram is illustrated in FIG. 4 in which the attraction or pulling force P, with which the armature 35 is attracted by the magnet when current is supplied to the winding 31, and with which the valve needle 39 is thus pressed against its seat 43, is plotted in dependence on the stroke $h$ of the valve needle 39. By an appropriate, corresponding design and shape of the annular gap 34 and of the armature 35, it can be achieved that an attracting force P can be realized thereby with the characteristics illustrated in the diagram of FIG. 4. If this stroke $h$ is selected in such a manner that the valve needle 39 is located in the closing position at the point $h_0$ and at the point $h_m$ in the maximum opening position, then within this operating range $a$, the force P, i.e., the energizing current I for the winding 31, and in dependence thereon the pilot or pre-control pressure $p_v$ in the line 28 remains practically constant notwithstanding the fact that the flow cross-section between the valve needle end 42 and the valve seat 43 increases with the valve stroke. In other words, FIG. 4 illustrates the attraction force-path diagram of the solenoid valve whereby the attraction force P of the magnet is plotted against the stroke, and more particularly beyond the closing position $h_o$ of the valve, i.e., under the assumption that a valve seat would not be present. From the characteristic curve P resulting therefrom, that range is selected for the effective stroke $a$ in which the attraction force P and correspondingly also the precontrol pressure in the line 28 is constant.

Figure 5:
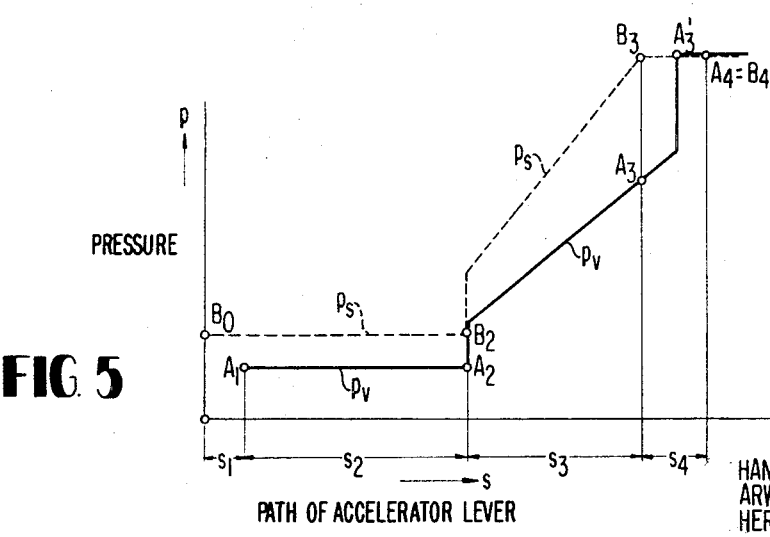
FIG. 5 is a diagram illustrating the relationship between pressure and adjusting path.

The pilot or pre-control pressure $p_v$ in the line 28 as well as the control pressure $p_s$ in the line 64 which is used for the shifting operations is plotted in the diagram of FIG. 5 against the path $s$ of the accelerator lever 20. By reason of the throttle 48 a certain pressure builds up upstream of the throttle 48 in the line 49, which pressure continues with a corresponding adjustment of the slide valve part 50 in the line 64 and produces therein a predetermined working pressure (control or shifting pressure) $p_s$ which corresponds with a non-actuated accelerator lever 20, for example, in the diagram according to FIG. 5 to the point $B_0$.

If the accelerator lever 20 is depressed so that the sliding contact or potentiometer arm 22a moves in a direction opposite the direction $x_1$, i.e., in the direction of arrow $x_2$ from point $A_0$ to point $A_1$ and the solenoid winding 31 is therefore supplied with current, then the valve needle 39 is forced with increasing current strength against the valve seat 43 whereby a pilot or pre-control pressure is able to build-up in the line 28. This pilot or pre-control pressure $p_v$ which is substantially constant as the sliding contact or potentiometer arm 22a moves from point $A_1$ to point $A_2$, acts in the space 61 on the slide valve part 51 which thereby displaces the slide valve part 51 toward the right as viewed in FIG. 1 while compressing the realtively weak spring 56. The control groove 66 is thereby covered or closed off by the right edge of the slide valve part 51 so that the "idling-gas" signal is rendered ineffective. After a predetermined stroke of the slide valve part 51, the latter abuts against the left end of the spring guide part 58. During this stroke $s_2$ up to the point $A_2$ in FIGS. 2 and 5, a further increase of the pilot or pre-control pressure $p_v$ as well as also of the control pressure $p_s$ in the line 64 does practically not occur.

During the further actuation of the accelerator lever 20, during which the sliding contact or potentiometer arm 22a moves from point $A_2$ along the resistor $R_1$ in the direction of arrow $x_2$, for example, with gradual decrease of the interconnected resistance $R_1$ (FIG. 3) and amplification of the energizing current of the solenoid winding 31, the right spring 52 is now also compressed by means of the center spring 59 which initially still remains non-yielding or inflexible, in that the spring plate 53 lifts off from its abutment 54. The control part 50 thereby retains in principle its position whereby the pilot or pre-control pressure $p_v$ in the space 61 and the control pressure $p_s$ in the line 64 and in the space 65 increases approximately proportionally corresponding to the stroke $s_3$ in FIG. 5 from point $A_2$ to point $A_2'$ and from point $B_2$ to point $B_3$, respectively, i.e., proportionally to the resistance decrease at the point where the potentiometer arm 22a contacts the resistor $R_1$. The pressure $p_s$ in the space 65 thereby acts in opposition to the pressure $p_v$ in the space 61. The pressure $p_s$ controlled by the piston 50 in line 64 reaches at the point $B_3$ the value of the feed or supply pressure in line 49c. During a further increase of the pressure $p_v$ from point $A_3$ to point $A_3'$, the piston 50 is forced toward the right against the housing by the piston 51, the spring guide means 58, the compression spring 59, and the pressure pin 60 so that the line 64 comes into free communication with the line 49, and therewith the control pressure $p_s$ assumes in the last stroke portion $s_4$ the maximum pressure corresponding to the modulating pressure $p_m$ in the line 49.

The feed or modulating pressure $p_m$ is appropriately adjustable by conventional means whereby also the maximum value of the control pressure $p_s$ is adjustable at the point $B_3$ via the resistance $R_4$.

The pilot or pre-control pressure $p_v$ attains the so-called "full-gas point" at point $A_2'$ $-A_3$. With a completely depressed accelerator lever 20, i.e., after a pedal stroke $s_4$, the pilot or pre-control pressure $p_v$ with a corresponding construction of the transmitter 22 also increases to the value of the supply or inlet pressure $p_m$ which is reached, for example, at point $A_3$. At point $A_3'$, the end position of the accelerator lever 20 is reached.

As precontrol pressure the idling pressure $p_v$ upstream of the solenoid valve 27 is lower as a rule than the supply pressure produced at the pump 49a. Since the oil losses depend from the pressure, they are correspondingly small. The switches 23 and 24 have the purpose to engage certain speed ranges of the transmission, i.e., for example, only the second speed which in many cases is particularly advantageous.

Figure 6:
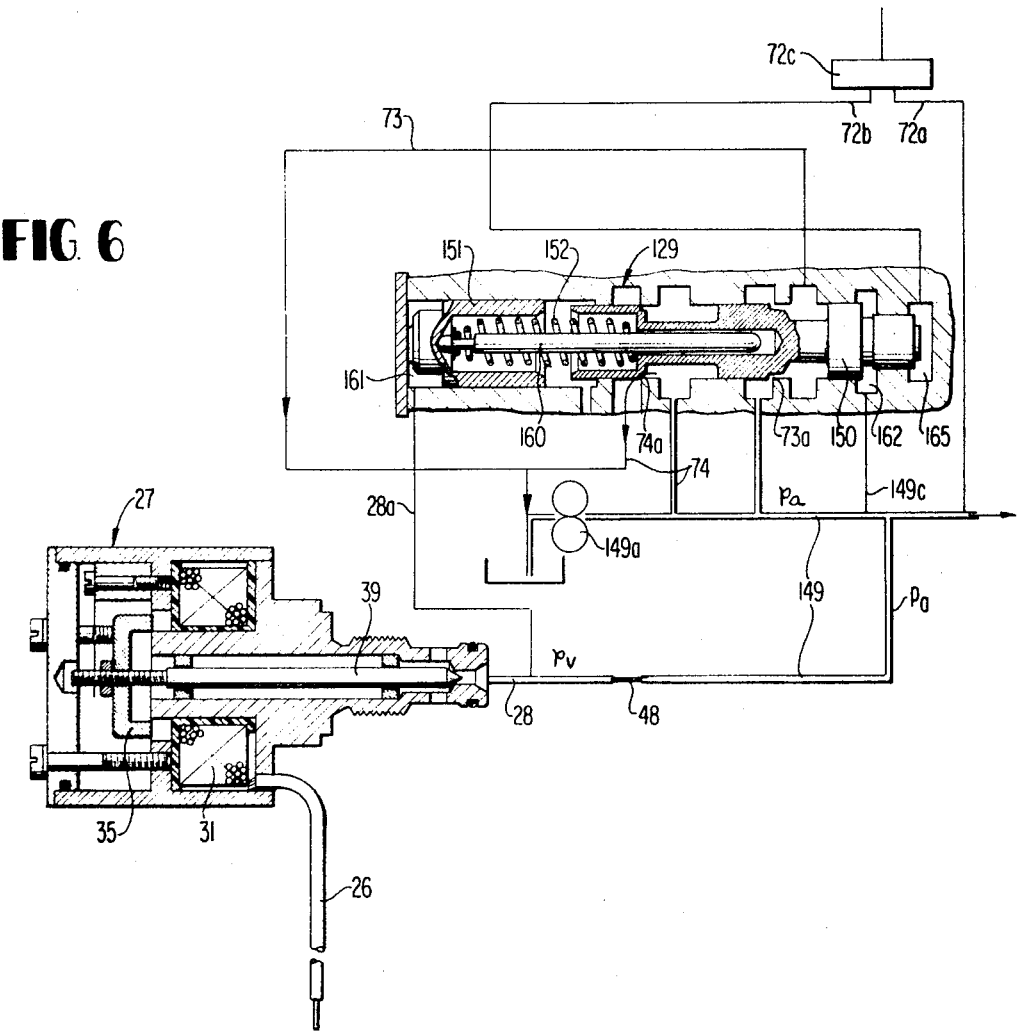
FIG. 6 is a somewhat schematic diagrammatic view of a modified embodiment of a control installation with a magnetic valve in accordance with the present invention actuated in dependence on the engine torque.

It is assumed in the embodiment according to FIG. 6 that the magnet winding 31 of the magnetic pilot control valve 27 is supplied with a current proportional to the torque of the engine by way of the line 26. Different correcting magnitudes, such as rotational speed and temperature may be again taken into consideration. The magnetic valve regulates or controls therewith a pilot or pre-control pressure $p_v$ of the hydraulic medium flowing through the line 28, proportional to the torque which hydraulic medium is supplied from a pump 149a by way of the line 149 and the throttle 48.

This pressure $p_v$ is again fed to the end face of a slide valve part 151 in the space 161 of a slide valve unit generally designated by reference numeral 129 for the control of a working pressure in dependence on the torque whereby the slide valve part 151 is forcelockingly supported against the slide valve part 150 by a spring 152 and after a certain relative stroke of the piston part 150 is positively supported by a pressure pin 160.

A load or receiver line 72a, 72b with an interconnected control device 72c of any conventional construction, for example, for a clutch or a servomechanism of the automatic shifting system, branches off from the line 149 whereby the line 72b terminates in the space 165 on the right side of the control slide valve part 150 whereas a line 149c leads to the groove 162 of the control part 150 of the control slide valve unit 129. A lubricating circulatory system 73 connected to the pump 149a may also be controlled by the control slide valve 129. The arrangement is thereby made in such a manner that upon movement of the control slide valve part 150 toward the left, the control edge 73a opens the lubricating circulatory system 73 before a control edge 74a opens up a return line 74.

Figure 7:
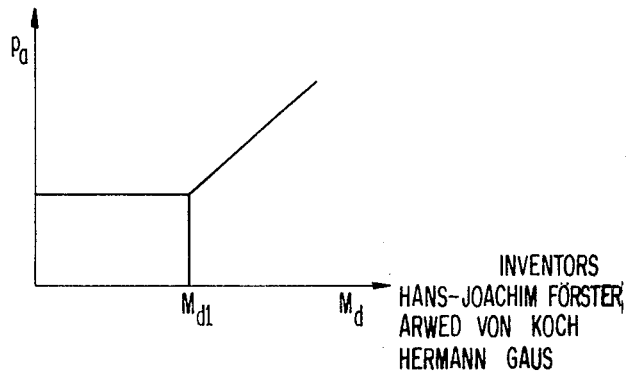
FIG. 7 is a diagram illustrating the operation of the control installation of FIG. 6.

In the diagram according to FIG. 7, the working pressure $p_a$ in the line 149 is schematically plotted against the torque $M_d$. Up to a torque $M_{d_1}$ the slide valve part 151 is displaced against the effect of the spring 152 by the pilot or pre-control pressure $p_v$ effective in the space 161. Since the spring pressure is practically constant in that case, also the working pressure $p_a$ remains practically constant. However, as soon as the slide valve parts 151 and 150 abut against one another, the pressures in the spaces 162 and 165 operating against the pilot or pre-control pressure $p_v$ increase proportionally to the pilot control pressure $p_v$ corresponding to the curve $p_a$ in FIG. 7.

Figure 8:
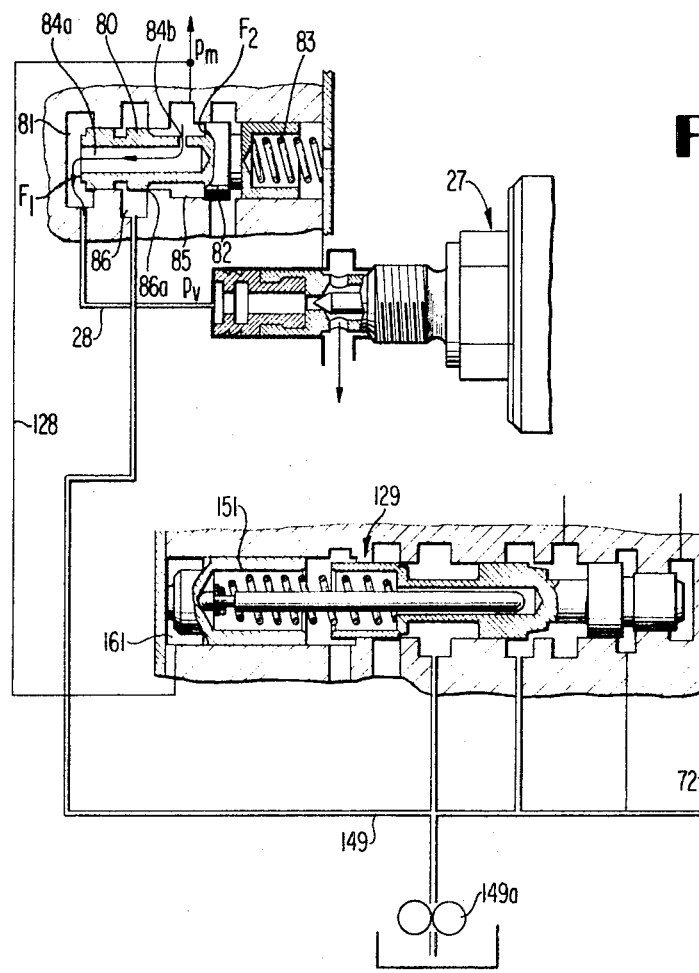
FIG. 8 is a somewhat schematic view of a still further modified embodiment of a control installation provided with a magnetic valve in accordance with the present invention, similar to FIG. 6.

In contradistinction to the shifting arrangement according to FIG. 6, described hereinabove, it may be achieved with a shifting arrangement according to FIG. 8 that the pilot or pre-control pressure $p_v$ in the line 28 controlled by the magnetic pilot control valve 27 initially influences the modulating pressure $p_m$, and the latter only influences the working pressure $p_a$. Such a shifting arrangement has the advantage that in case of failure of the electric transmission, a collapse of the working pressure $p_a$ is avoided. However, it is necessary in connection with the construction according to FIG. 8 that the current fed to the magnetic pilot control valve be inversely proportional to the torque.

A control slide valve 80 (FIG. 8) which serves for the control of the modulating pressure $p_m$, is constructed as differential slide valve member and is provided with an end surface $F_1$ in the pressure space 81 and with an annular surface $F_2$ at a control spool-portion 82 offset to a larger diameter with respect to the remaining slide valve body. The space 81 in front of the end surface $F_1$ is connected by way of a longitudinal bore 84a and a cross bore 84b, which is constructed as throttle, with the annular space 85 in front of the annular surface $F_2$. The pilot or pre-control pressure $p_v$ acting against the end surface $F_1$ and the controlled modulating pressure $p_m$ acting on the annular surface $F_2$ thereby operate against the compression spring 83.

The annular space 85 is connected by way of a line 128 with the space 161 in front of the slide valve part 151 of the control slide valve unit 129 which, as to the rest, is constructed in the same manner as in the case of FIG. 6, whereby exclusively the shifting arrangement of the control slide valve unit 129 is changed to the extent that the line 149 together with the line 72 leading to the receiver or load places is not connected directly with the line 28 for the pilot or pre-control pressure $p_v$ by way of a throttle. The line 149, instead, leads to the space 86 at the modulating pressure control slide valve 80, from where the pressure can continue by way of a control edge 86a of the control slide valve 80 into the annular space 85 and is controlled thereby corresponding to the position of the control slide valve 80.

Figure 9:
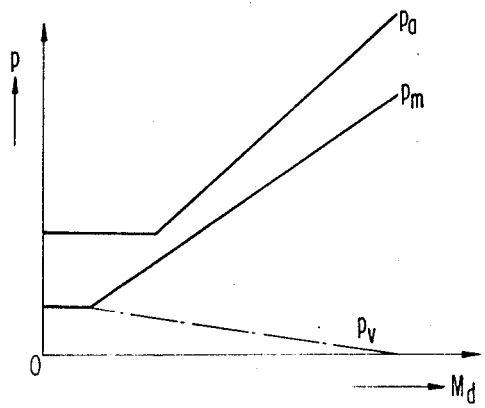
FIG. 9 is a diagram illustrating the operation of the control installation of FIG. 8.

With an increasing torque, the pilot or pre-control valve 27 regulates a decreasing pressure $p_v$, as can be seen from the diagram of FIG. 9, in which the pressure $p$ is plotted against the torque $M_d$ in the curve indicated in dash and dotted line. With the decrease of the pressure $p_v$, also the hydraulic pressure acting against the end surface $F_1$ of the modulating pressure control slide valve 80 decreases so that the spring 83 seeks to displace the control slide valve 80 toward the left. As a result of the decreasing throttle effect at the control edge 86a, the pressure at the annular surface $F_2$ increases until the equilibrium is re-established with respect to the spring 83. The modulating pressure $p_m$ and therewith also the working pressure $p_a$ increases approximately corresponding to the engine torque $M_d$ according to the curves indicated in FIG. 8.

If the magnetic valve 27 fails for any reason, then the pressure $p_v$ at the end surface $F_1$ collapses. The slide valve 80 is displaced toward the left and closes the line 28 with respect to the bore 84a and therewith with respect to the line 128 and 149. A high pressure corresponding to the maximum modulating pressure $p_m$ results in that case at the annular surface $F_2$, in a manner similar as described before so that the transmission cannot fail by reason of inadequate oil pressure.

Figure 10:
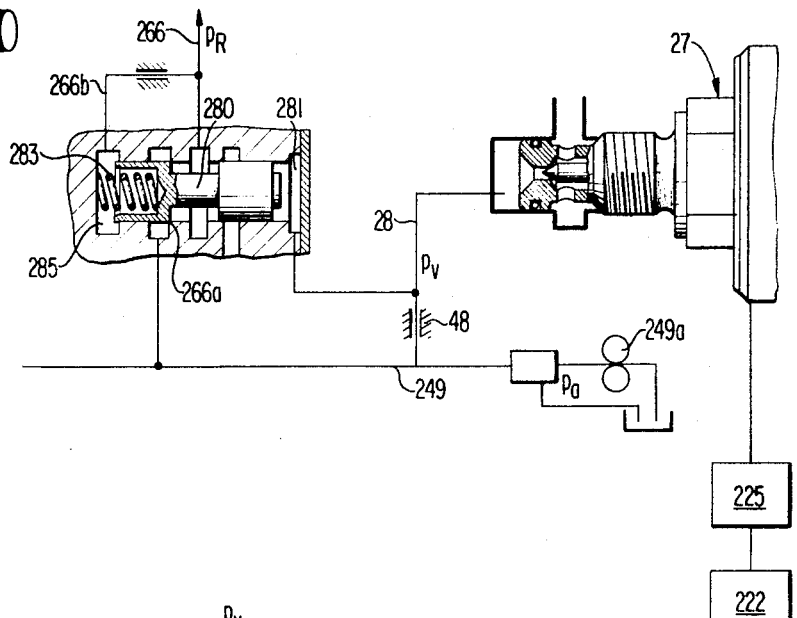
FIG. 10 is a somewhat schematic view of still another modified embodiment of a control installation with a magnetic valve in accordance with the present invention operated in dependence on the vehicle velocity.

A shifting arrangement for the change of a pilot or pre-control pressure $p_v$ in dependence on the driving velocity of the vehicle or on a rotational speed of the vehicle drive is schematically illustrated in FIG. 10.

A rotational speed transmitter 222 of conventional construction, for example, as shown in FIG. 2 in connection with transmitter 22, utilizing a potentiometer whose potentiometer arm is displaced as a function of the rotational speed, for example, by a centrifugal governor, not shown in detail since of conventional construction, regulates a current which is supplied by way of an amplifier 225 to the solenoid valve 27 operating as pilot or pre-control valve whereby the current energizing the magnet coil is a function of the velocity or rotational speed. The line 28 which is connected by way of a throttle 48 with a line 249 fed by a pump 249a, also continues to a space 281 which acts on the control slide valve 280 on one end surface thereof and seeks to displace the same toward the left against the effect of a spring 283 accommodated in a space 285. A line 266 branched off from the line 249 and having the pressure $p_R$ which is controlled by the control slide valve 280 at a control edge 266a, may lead to the shifting elements of the transmission, for example, to the rotational-speed-dependent side of the command slide valves whose opposite sides are acted upon, for example, dependent on the torque. A branch line 266b leads by way of a throttle to the space 285 so that the pressure of the medium present in the space 285 and the pressure of the spring 283 act in opposition to the electrically controlled pressure $p_v$ in the space 281. Further working stations can be connected to the line 249.

Figure 11:
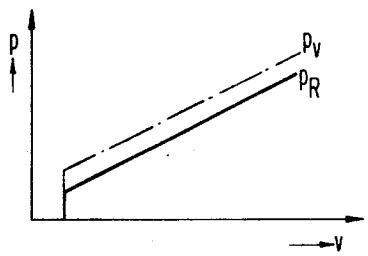
FIG. 11 is a diagram illustrating the operation of the installation of FIG. 10.

A diagram is illustrated in FIG. 11 in which the pressure $p$ is plotted against the velocity $v$ and from which follows that the pressure $p_R$ in the line 266 as also the pilot or pre-control pressure $p_v$ in the line 28 increases proportionally with the rotational speed or velocity $v$.

Figure 12:
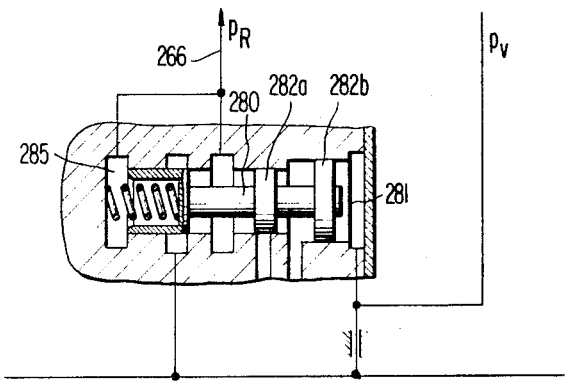
FIG. 12 is a somewhat schematic view illustrating a modified embodiment of the control installation of FIG. 10.
Figure 13:
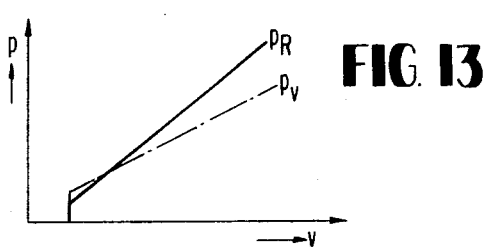
FIG. 13 is a diagram illustrating the operation of the control installation of FIG. 12.

The embodiment according to FIG. 12 differs from that of FIG. 10 only in that the control slide valve 280 is constructed as differential slide valve having the piston parts 282a and 282b, whereby the characteristics for the hydraulic pressures $p_v$ and $p_R$ illustrated in FIG. 13 can be attained. The slide valve 280 is made in one piece but may also be composed of two piston parts without affecting its operation.

In the embodiments according to FIGS. 10 to 13, the pressure $p_v$ is thus increased either additively (FIG. 13) or proportionally (FIG. 11) by way of the hydraulic control slide valve. If the lands or piston parts 282a and 282b are of identical dimensions (FIG. 10) then also the pressures $p_v$ and $p_R$ are equal-apart from the spring pressure of the lands or spring 283. If the lands or piston parts 282a and 282b are of unequal diameters (FIG. 12), then $p_v$ is larger than $p_R$ in order that the control device is in equilibrium which is desirable.

While we have shown and described several embodiments in accordance with the present invention, it is understood that the same is not limited thereto but is susceptible of numerous changes and modifications as known to those skilled in the art, and we therefore do not which to be limited to the details shown and described herein but intend to cover all such changes and modifications as are encompassed by the scope of the appended claims.

We claim:

1. A pressure control installation for hydraulically shifted automatic transmission of a machine having a line system for a pressure fluid comprising a source of pressure fluid for the line system, transmitter means for generating an electric output signal in dependence on an operating magnitude of the machine, control means connected in the line system for providing a control pressure for shifting of the transmission, said control means including electric pressure regulating means responsive to the electric output signal of said generating means for effecting the regulation of the control pressure in dependence on the operating magnitude, said electric pressure regulating means including solenoid valve means having an electro-magnet and including a magnetic housing and magnetic core with an annularly shaped gap therebetween, and a bell-shaped armature arranged for movement of its cylindrical rim within said annularly shaped gap such that the range of movement of said armature is effected under an essentially constant magnetic force produced by said electromagnet and said electric output signal, said control means including a further pressure regulating means, said electric pressure regulating means applying a pilot control pressure to said further pressure regulating means, and at least one working pressure supplied by said pressure source being applied to said further pressure regulating means in opposition to the pilot control pressure, said further pressure regulating means being responsive to the applied pressures for regulating the control pressure for effecting the shifting of the transmission, said further pressure regulating means actuated by the electrically controlled pilot control pressure including a first slide valve means acted upon by said control pressure and a second slide valve means which is acted upon by a working pressure supplied by said pressure source and controlled by said further pressure regulating means in a direction opposite to said pilot control pressure, a spring guide means having a pressure element displaceable relative thereto in one direction and provided with spring abutment means as well as three spring means interconnected between said first and second slide valve means, the weakest one of said spring means being arranged between the first slide valve means and the spring guide means, the second strongest spring means being arranged with prestress between an abutment at the spring guide means and the spring abutment means whereas the third spring means having a strength intermediate the first and second spring means is supported, on the one hand, at the second slide valve means and, on the other, at the spring abutment means forcing the same against a fixed abutment.

2. A pressure control installation according to claim 1, wherein said further pressure regulating means includes means responsive to the electrically controlled pilot control pressure for producing signals for at least one of two output pressures consisting of an idling pressure signal and a full-load pressure signal.

3. A pressure control installation according to claim 1, characterized in that the machine is a motor vehicle and the operating magnitude is the position of an accelerator lever.

4. A pressure control installation according to claim 1, characterized in that said magnetic valve means is opened by a pilot control pressure of said hydraulic medium.

5. A pressure control installation according to claim 1, characterized in that an amplifier means is connected between the transmitter means and the electric pressure regulating means.

6. A pressure control installation according to claim 5, characterized in that said transmitter means is a potentiometer.

7. A pressure control installation according to claim 1, characterized by means for supporting the armature for substantially frictionless movement.

8. A pressure control installation according to claim 7, wherein said supporting means is a leaf spring.

9. A pressure control installation for hydraulically shifted automatic transmission of a machine having a line system for a pressure fluid comprising a source of pressure fluid for the line system, transmitter means for generating an electric output signal in dependence on an operating magnitude of the machine, control means connected in the line system for providing a control pressure for shifting of the transmission, said control means including electric pressure regulating means responsive to the electric output signal of said generating means for effecting the regulation of the control pressure in dependence on the operating magnitude, said electric pressure regulating means including solenoid valve means having an electromagnet and including a magnetic housing and magnetic core with an annularly shaped gap therebetween, and a bell-shaped armature arranged for movement of its cylindrical rim within said annularly shaped gap such that the range of movement of said armature is effected under an essentially constant magnetic force produced by said electromagnet and said electric output signal, said control means include a further pressure regulating means, said electric pressure regulating means applying a pilot control pressure to said further pressure regulating means, and at least one working pressure supplied by said pressure source being applied to said further pressure regulating means in opposition to the pilot control pressure, said further pressure regulating means being responsive to the applied pressures for regulating the control pressure for effecting the shifting of the transmission, said further pressure regulating means including first means responsive to a predetermined pilot control pressure applied thereto for providing a constant output control pressure from said further pressure regulating means, and second means responsive to a pilot control pressure exceeding the predetermined pressure for providing an output control pressure which increases in accordance with increasing pilot control pressure within a predetermined range until a maximum pilot control pressure is obtained whereby a maximum constant output control pressure is provided, said first means including a first slide valve and a first spring means biasing the slide valve in a direction opposite to the pilot control pressure, such that the first slide valve abuts against a spring guide means in response to the predetermined pilot control pressure, and said second means including a second slide valve and a second spring means arranged between the second slide valve and said first means, said second spring means being compressed in response to the pilot control pressure exceeding the predetermined pressure and causing the second slide valve to move against a fixed abutment.

10. A pressure control installation for controlling pressure fluid in a line system comprising a source of pressure fluid for the line system, control means connected in the line system for regulating the pressure therein including electric pressure regulating means providing a pilot control pressure and further pressure regulating means for providing an output control pressure, said further pressure regulating means being actuated by the electrically controlled pilot control pressure and including a first slide valve means acted upon by said pilot control pressure and a second slide valve means which is acted upon by a working pressure supplied by said pressure source and controlled by said further pressure regulating means in a direction opposite to said pilot control pressure, a spring guide means having a pressure element displaceable relative thereto in one direction and provided with spring abutment means as well as three spring means interconnected between said first and second slide valve means, the weakest one of said spring means being arranged between the first slide valve means and the spring guide means, the second strongest spring means being arranged with prestress between an abutment at the spring guide means and the spring abutment means whereas the third spring means having a strength intermediate the first and second spring means is supported, on the one hand, at the second slide valve means and, on the other, at the spring abutment means forcing the same against a fixed abutment.

11. A pressure control installation according to claim 10, wherein the line system connected to the pressure source includes a first line system for the electrically controlled pilot control pressure acting on the further pressure regulating means which is operatively connected with a second line system for the working pressure supplied by the pressure source by way of a throttle means.

* * * * *